(12) United States Patent
Jünke et al.

(10) Patent No.: US 8,382,144 B2
(45) Date of Patent: Feb. 26, 2013

(54) CORRUGATION BELLOWS OF A TRANSFER BETWEEN TWO PIVOTABLY INTERCONNECTED VEHICLES

(75) Inventors: Volker Jünke, Felsberg (DE); André Goebels, Kassel (DE)

(73) Assignee: Hübner GmbH, Kassel (DE)

( * ) Notice: Subject to any disclaimer, the term of this patent is extended or adjusted under 35 U.S.C. 154(b) by 55 days.

(21) Appl. No.: 13/014,107

(22) Filed: Jan. 26, 2011

(65) Prior Publication Data

US 2011/0193318 A1 Aug. 11, 2011

(30) Foreign Application Priority Data

Feb. 5, 2010 (EP) ..................................... 10001203
Feb. 19, 2010 (EP) ..................................... 10001703

(51) Int. Cl.
*B60D 5/00* (2006.01)
(52) U.S. Cl. .......................................... 280/403; 105/18
(58) Field of Classification Search .................... 105/18, 105/8.1, 15, 19, 20; 280/400, 403
See application file for complete search history.

(56) References Cited

U.S. PATENT DOCUMENTS

| | | | | |
|---|---|---|---|---|
| 473,954 A | * | 5/1892 | Perry | 105/18 |
| 1,056,407 A | * | 3/1913 | Forsyth | 105/19 |
| 1,450,007 A | * | 3/1923 | Pflager | 105/18 |
| 2,193,156 A | * | 3/1940 | Antoine | 280/403 |
| 4,452,465 A | * | 6/1984 | Bourke | 280/403 |
| 4,570,964 A | * | 2/1986 | Tatay et al. | 280/403 |
| 4,905,607 A | * | 3/1990 | Wanneroy | 105/8.1 |
| 5,033,395 A | * | 7/1991 | Bechu et al. | 105/18 |
| 5,060,578 A | * | 10/1991 | Carimentrand | 105/18 |
| 5,456,186 A | * | 10/1995 | Hubner | 105/18 |
| 5,546,866 A | * | 8/1996 | Koch | 105/8.1 |
| 5,785,372 A | * | 7/1998 | Glatzmeier et al. | 296/24.45 |
| 5,884,565 A | * | 3/1999 | Koch | 105/20 |
| 6,085,403 A | * | 7/2000 | Petit | 29/454 |
| 6,196,132 B1 | * | 3/2001 | Hubner | 105/18 |
| 2004/0075239 A1 | * | 4/2004 | Call | 280/403 |
| 2010/0025961 A1 | * | 2/2010 | Tabellini et al. | 280/403 |

FOREIGN PATENT DOCUMENTS

| | | |
|---|---|---|
| DE | 202005008670 U1 | 10/2006 |
| EP | O558295 A1 | 9/1993 |
| FR | 914247 A | 10/1946 |

\* cited by examiner

*Primary Examiner* — Anne Marie Boehler
*Assistant Examiner* — Maurice Williams
(74) *Attorney, Agent, or Firm* — Gifford, Krass, Sprinkle, Anderson & Citkowski, P.C.

(57) ABSTRACT

The subject of the invention is a corrugation bellows of a transfer between two vehicles which are articulated together, comprising a plurality of corrugations which are U-shaped in cross-section, wherein two adjacent corrugations are connected together by a frame, wherein the corrugation of U-shaped cross-section has two limbs as well as a web connecting the limbs, wherein the material thickness of the web is greater than the material thickness of the limbs, wherein the material of web and limbs is identical and wherein the web is of substantially planar construction so that the limbs and the web extend at right angles to one another in a substantially neutral setting of the bellows.

8 Claims, 1 Drawing Sheet

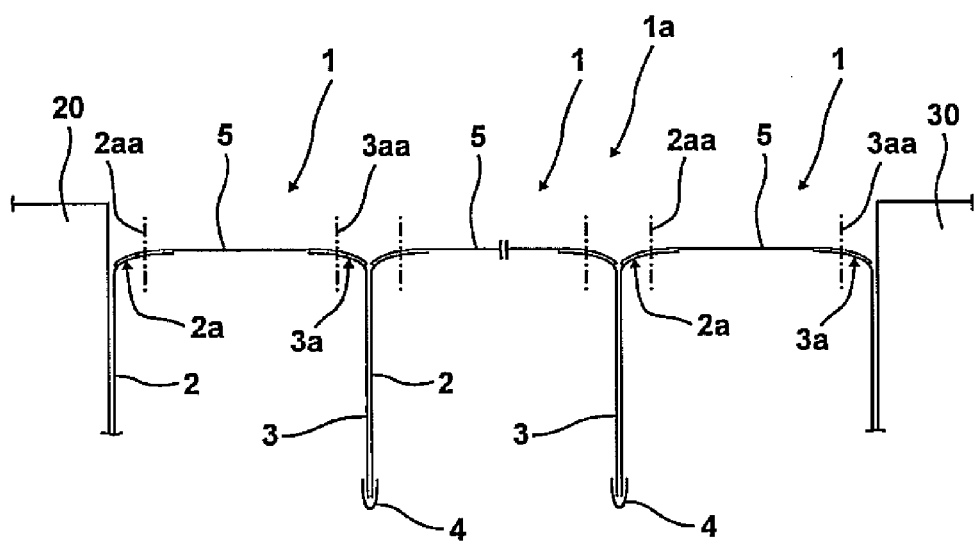

CORRUGATION BELLOWS OF A TRANSFER BETWEEN TWO PIVOTABLY INTERCONNECTED VEHICLES

CROSS-REFERENCE TO RELATED APPLICATIONS

This application claims priority of European Patent Applications EP 10 001 203.8 filed Feb. 5, 2010 and EP 10 001 703.7 filed Feb. 19, 2010.

FIELD OF THE INVENTION

The invention relates to a corrugation bellows of a transfer between two vehicles which are articulated together, comprising a plurality of U-shaped corrugations, wherein two adjacent corrugations are connected together by a frame and wherein the corrugation of U-shaped cross-section has two limbs and a web connecting the limbs.

BACKGROUND OF THE INVENTION

A corrugation bellows of the kind stated in the introduction is, as part of a transfer between two pivotably interconnected vehicles, sufficiently well known from the prior art and does not need to be explained in more detail at this point.

Corrugation bellows of that kind are, as has already been explained, used for bridging over the spacing between two pivotably interconnected vehicles. It is known that the arrangement of the bellows between two pivotably interconnected vehicles is carried out directly in the region of the actual corridor and surrounds the corridor in rectangular manner. In this regard, a spacing of between 30 and 50 centimeters is present between the outer circumferential surface of this transfer bellows and the outer wall of the vehicle body. This has the consequence, particularly in the case of rapid travel, of a not insignificant formation of turbulence, which considerably increases the air resistance.

In order to provide a remedy here it is conceivable to attach the bellows of a transfer in the region of the outer contour of the vehicle, i.e. in the ideal case the outer side of the bellows forms together with the outer wall of the vehicle a substantially continuous surface. This bellows extending at the outside in the region of the vehicle wall is in a given case part of a double corrugation bellows, wherein the optional other part of this bellows is led directly around the transfer bridge and in a given case also around the articulation joint. This means that in such a case there is a not insignificant spacing between the inner bellows and the outer bellows.

The disadvantage of use of a conventional corrugation bellows in the region of the outer wall of the vehicle, thus the arrangement of a bellows substantially equal in contour with the outer wall of the carriage, is that such a bellows exhibits not inconsiderable amounts of turbulence directly at the bellow surface, which is due to the fact that the individual corrugation elements of such a bellows are formed in the region of the web in arched shape. The reason for the arched shape of the webs resides in the fact that in the neutral setting of the bellows, thus in straight travel of the vehicle, the bellows is under slight pressure in longitudinal direction between the vehicles, wherein the curved shape of the webs arises substantially as a result.

SUMMARY OF THE INVENTION

The object of the invention accordingly consists in providing a corrugation bellows of the kind stated in the introduction, which exhibits a lesser degree of formation of turbulence on the outer side of the bellows.

In order to fulfil the object it is proposed in accordance with the invention to construct the web between the limbs to be planar so that in the case of a web of substantially planar form the limbs and the web extend at a right angle to one another in a substantially neutral state of the bellows. A corrugation with a planar web can, for example, be produced in the course of a shape-imparting process.

In this connection it is provided in accordance with a first variant that the material thickness of the web is formed to be greater than the material thickness of the limbs, wherein the material of the web and limbs is identical.

According to another variant it is provided that the material of the web is stiffer than the material of the limbs, so that here, too, in the case of the web of substantially planar form the limbs and the web extend at a right angle to one another in a substantially neutral state of the bellows. Alternatively, it can be provided to both form the material of the web to be stiffer and to increase the material thickness. This is always against the background that the web should remain substantially rigid, i.e. if the material of the web in the initial state forms a plane, such a planar form of the web is maintained when the web forms, in conjunction with the limbs, the corrugation of a corrugation bellows. For travel movements in which such a bellows must be able to flex this means that a lengthening of the bellows for bending, pitching and rolling movements is provided substantially solely by spreading apart of the individual corrugations in the region of the limbs. In the prior art it is the case that due to the arched construction of the web, through a lengthening of the web this similarly contributes—just by its lengthening—to a change in shape of the bellows in longitudinal direction.

Advantageous features with respect to the two forms of embodiment can be inferred from the subclaims.

Thus, it is particularly provided that for increasing the material thickness the web has several fabric laminations or fabric layers; it is clear therefrom that for increasing stability several laminations of a fabric are arranged one above the other, wherein the individual fabric laminations are provided on their mutual facing sides with a coating, for example of an elastomer or a silicon. A further possibility for increasing stiffness consists in plastically deforming the fabric layer of the bellows material of the web. In the case of a plastic deformation of the fabric, which consists of individual warp and weft threads, the interstices between the warp and weft threads are filled. The material is thereby intrinsically stiffened. Such a plastically deformed fabric is then coated on at least one side with synthetic material in order to form the bellows, which is produced therefrom, to be sealed.

According to a further feature of the invention the web is sewn and/or glued in overlapping manner to the limbs. In this connection, the limbs advantageously have in the transition to the web a projection which extends substantially at a right angle to the limb and which is connected with the web, for example by gluing or sewing. It is thereby achieved that the web itself does not have to extend up to the region of the limb, which would inevitably lead to an arched shape of the web.

BRIEF DESCRIPTION OF THE DRAWINGS

The invention is explained in more detail by way of example on the basis of the drawing which shows a bellows in accord with the present invention.

DETAILED DESCRIPTION OF THE PREFERRED EMBODIMENT

In this connection, the single FIGURE schematically shows a detail of a corrugation bellows 1a between two pivotably interconnected vehicles 20, 30, wherein the individual corrugations 1 of the bellows 1a have limbs 2 and 3 and wherein the limbs 2 and 3 are each held by a bellows frame 4. The limbs 2, 3 each have at the upper end a projection 2a, 3a, wherein the web 5 is connected with the limbs at 2aa, 3aa on the projection, in particular on the projection 2a, 3a extending substantially at right angles to the limbs 2, 3. The connection of the web with the projections can in that case be carried out not only from the inside, but also from the outside.

In this regard the material of the web 5 can in accordance with a first variant, as has already been described, be thicker than the material of the limbs, which equally leads to an increase in the stiffness of the web, as does also a suitable material selection with respect to a material for the web with increased stiffness by comparison with the material of the corrugation for the limbs 2, 3. Alternatively, as already explained an intrinsically stiff material for the web can be selected, wherein the stiffness of the material of the web is greater than that of the material of the limbs.

However, it is also conceivable to vulcanise the corrugation entirely in one shape and in this regard to predetermine the shape of the web in rectangular form, thus with a planarly extending web.

The invention claimed is:

1. A corrugation bellows for a transfer disposed between two pivotably interconnected vehicles, said corrugation bellows comprising:
   a plurality of corrugations, each of which are U-shaped in cross-section, wherein two adjacent corrugations are connected together by a frame, wherein the corrugation of U-shaped cross-section has two limbs and a web connecting the limbs, and wherein the web is constructed to be substantially planar so that the limbs and the web extend at right angles to one another in a substantially neutral setting of the bellows;
   wherein the web is comprised of a plurality of fabric layers for increasing the material thickness; and
   wherein the limbs have, at the transition to the web, a projection which extends substantially at a right angle to the limbs and which is connected with the web.

2. Corrugation bellows of a transfer according to claim 1, wherein fabric layers have a coating, on their mutually facing surfaces.

3. Corrugation bellows of a transfer according to claim 2, wherein said coating is comprised of an elastomer of a silicone.

4. Corrugation bellows of a transfer according to claim 1, wherein the web is glued and/or sewn in overlapping manner to the limbs.

5. Corrugation bellows of transfer according to claim 1, wherein the bellows material of the web is plastically deformed for increasing its stiffness.

6. A corrugation bellows for a transfer disposed between two pivotably interconnected vehicles, said corrugation bellows comprising: a plurality of corrugations, each of which are U-shaped in cross-section, wherein two adjacent corrugations are connected together by a frame, wherein the corrugation of U-shaped cross-section has two limbs and a web connecting the limbs, and wherein the web is constructed to be substantially planar so that the limbs and the web extend at right angles to one another in a substantially neutral setting of the bellows; wherein
   the material thickness of the web is greater than the material thickness of the limbs,
   and wherein the material of web and limbs is identical; and wherein the limbs have, at the transition to the web, a projection which extends substantially at a right angle to the limbs and which is connected with the web.

7. A corrugation bellows for a transfer disposed between two pivotably interconnected vehicles, said corrugation bellows comprising: a plurality of corrugations, each of which are U-shaped in cross-section, wherein two adjacent corrugations are connected together by a frame, wherein the corrugation of U-shaped cross-section has two limbs and a web connecting the limbs, and wherein the web is constructed to be substantially planar so that the limbs and the web extend at right angles to one another in a substantially neutral setting of the bellows; wherein the material of the web is stiffer than the material of the limbs; and wherein the limbs have, at the transition to the web, a projection which extends substantially at a right angle to the limbs and which is connected with the web.

8. A corrugation bellows for a transfer disposed between two pivotably interconnected vehicles, said corrugation bellows comprising:
   a plurality of corrugations, each of which are U-shaped in cross-section, wherein two adjacent corrugations are connected together by a frame, wherein the corrugation of U-shaped cross-section has two limbs and a web connecting the limbs, and wherein the web is constructed to be substantially planar so that the limbs and the web extend at right angles to one another in a substantially neutral setting of the bellows;
   wherein the limbs have, at the transition to the web, a projection which extends substantially at a right angle to the limb and which is connected with the web.

* * * * *